Patented Aug. 24, 1943

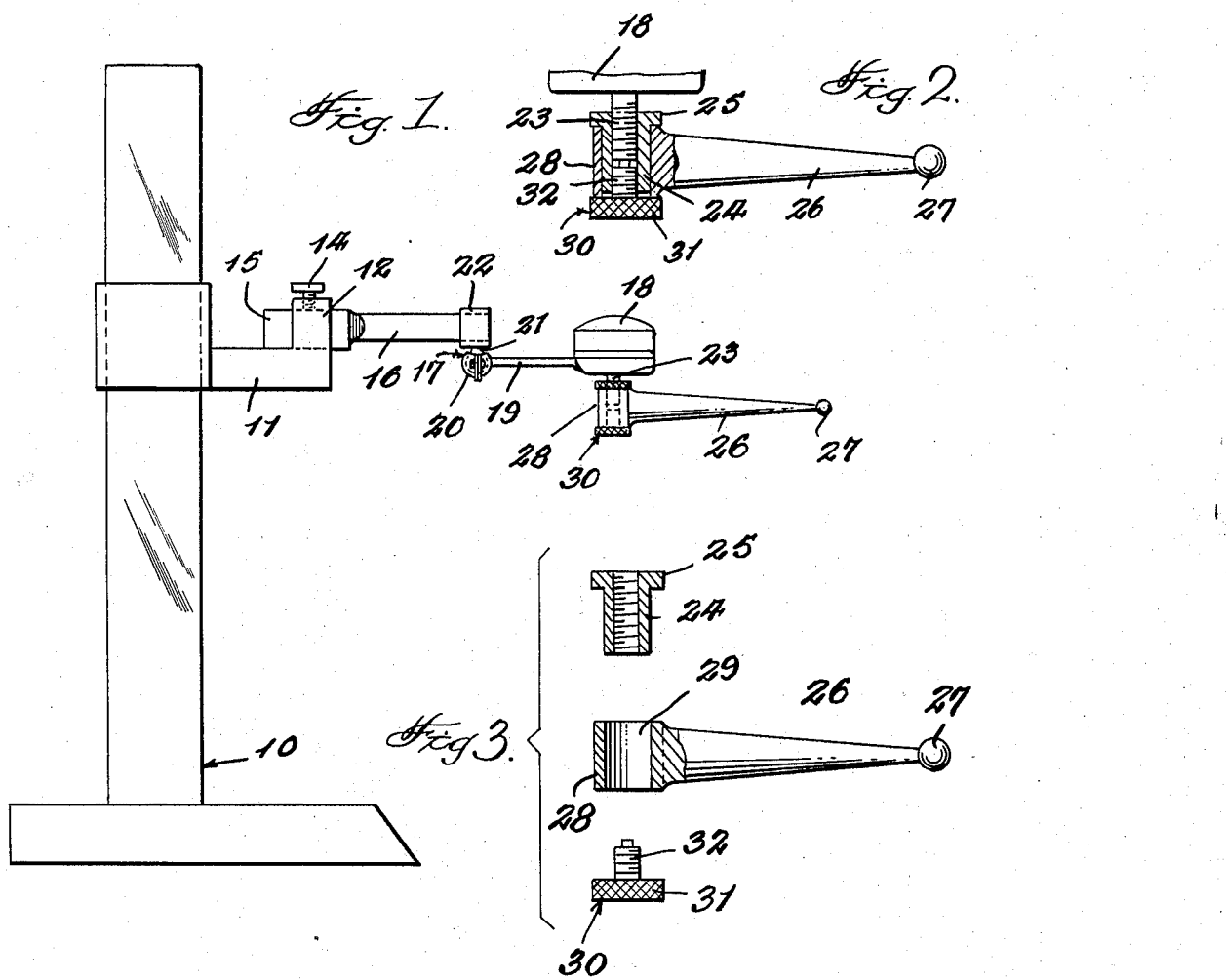

2,327,948

UNITED STATES PATENT OFFICE 2,327,948

HEIGHT GAUGE ARM ATTACHMENT FOR UNIVERSAL DIAL INDICATORS

Clyde W. Webster, Silvis, Ill.

Application March 11, 1943, Serial No. 478,792

1 Claim. (Cl. 33—172)

This invention relates to attachments for dial indicators and it consists on the constructions, arrangements and combinations herein described and claimed.

It is the object of the invention to provide novel attachments whereby universal dial indicators may be readily installed upon a height gauge.

It is also an object of the invention to provide an indicator attachment in the form of an arm which is adjustably mounted upon a dial indicator for the purpose of indicating under obstructions or overhanging clamps, or bolts, as in lathe face plate works as well as to indicate bores and the like.

It is a still further object of the invention to provide a novel connection between the dial indicator and indicator arm permitting the latter to have a movement of 360 degrees and embodying means for locking the arm in an adjusted position.

Additional objects, advantages and features of invention will be apparent from the following description considered in conjunction with the accompanying drawing, wherein, Figure 1 is a side elevation of a height gauge having my attachment installed, Figure 2 is an enlarged elevation, partly in section, illustrating the mounting of the arm upon the dial indicator, Figure 3 illustrates the parts in section and in separated relation.

Figure 4 is a perspective view of the adapting arbor employed in the assembly.

There is illustrated a height gauge 10 of conventional form having a vertically adjustable arm 11 including a jaw 12 at its outer free end.

Within the jaw 12 an adapter arbor 13 is secured by means of a set screw 14. The arbor 13 consists of a flat portion 15 complemental to the jaw and an elongated cylindrical portion 16 adapted to mount a Starret universal swivel 17. The universal swivel employed is the Starret universal swivel and includes a dial indicator generally indicated by the reference character 18. I make no claim to the construction of the swivel. It will be noted that the dial indicator 18 comprises a bracket arm 19, the outer end of which carries a socket member 20 which is fixed upon a sliding yoke 22, the latter being engaged upon the cylindrical portion 16 of the adapter.

The dial indicator 18 is provided with a threaded shank 23 projecting from the lower medial center thereof and receives an internally threaded sleeve 24. The sleeve 24 is provided with a knurled head 25 for rotating the sleeve as will be explained.

An indicator arm 26 is employed, consisting of an elongated tapering member of suitable length, terminating at one end in a ball pointer 27. The opposite end of the arm 26 is formed with a boss 28 having a bore 29 of a diameter to freely fit upon the sleeve 24. The boss 28 is of a length slightly greater than that of the sleeve 24, as may be seen in Figure 2.

In order to maintain the arm 26 in position upon the sleeve 24, a screw 30 is employed, having a knurled head 31 and a threaded shank 32 of a diameter to operatively engage the threads of the sleeve 24.

It will be readily understood that by loosening the screw 30 slightly, the arm 26 may be rotated about the sleeve 24 to any desired extent and held in such position by tightening of the screw. It will also be seen that the arm 26 may be located at different positions upon the shank 23 by merely removing the screw 30 and rotating the sleeve 24 to a desired position upon the shank.

In view of the fact that the sleeve 24 is of shorter length than the boss 28 it is possible to firmly grip the boss of the arm between the heads 25 and 31, and thereby retain the arm in an adjusted position.

While I have shown and described a preferred form of the device, this is by way of illustration only and I consider as my own all such modifications in construction as fairly fall within the scope of the appended claim.

I claim:

In combination with a height gauge having a dial gauge universally swivelled thereon, said dial gauge having a downwardly projecting threaded shank, an internally threaded sleeve on the shank and having a knurled head at its upper end, an indicator arm having an apertured boss complemental to the sleeve and rotatable therearound, said boss being of a length greater than the sleeve, and a headed screw having a shank threadedly engaged in the lower end of the sleeve, whereby tightening of the screw will effect frictional binding engagement between the knurled head, the boss and said headed screw.

CLYDE W. WEBSTER.